No. 867,293. PATENTED OCT. 1, 1907.
F. NOBLE & F. WIETZER.
REFUSE SEPARATOR FOR BEETS.
APPLICATION FILED DEC. 22, 1906.

Witnesses
Inventors
F. Noble
F. Wietzer

UNITED STATES PATENT OFFICE.

FREDERICK NOBLE AND FREDERICK WIETZER, OF ROCKY FORD, COLORADO.

REFUSE-SEPARATOR FOR BEETS.

No. 867,293.　　　　　Specification of Letters Patent.　　　　Patented Oct. 1, 1907.

Application filed December 22, 1906. Serial No. 349,194.

*To all whom it may concern:*

Be it known that we, FREDERICK NOBLE and FREDERICK WIETZER, citizens of the United States, both residing at Rocky Ford, in the county of Otero and State of Colorado, have invented certain new and useful Improvements in Refuse-Separators for Beets; and we do hereby declare the following to be a full, clear, and exact description of the invention, such as will enable others skilled in the art to which it appertains to make and use the same.

This invention relates to improvements in apparatus for separating refuse matter from vegetable products, and is primarily designed for use in separating the foreign matter, such as leaves, weeds, stems, grass, etc., from sugar beets, and in weeding out this trashy matter to do so without the necessary aid of water, as is commonly employed.

While I do not restrict myself to the exact details of construction shown, yet for the purpose of disclosure reference is had to the accompanying drawings illustrating a practical embodiment of the invention, and in which:—

Figure 1:
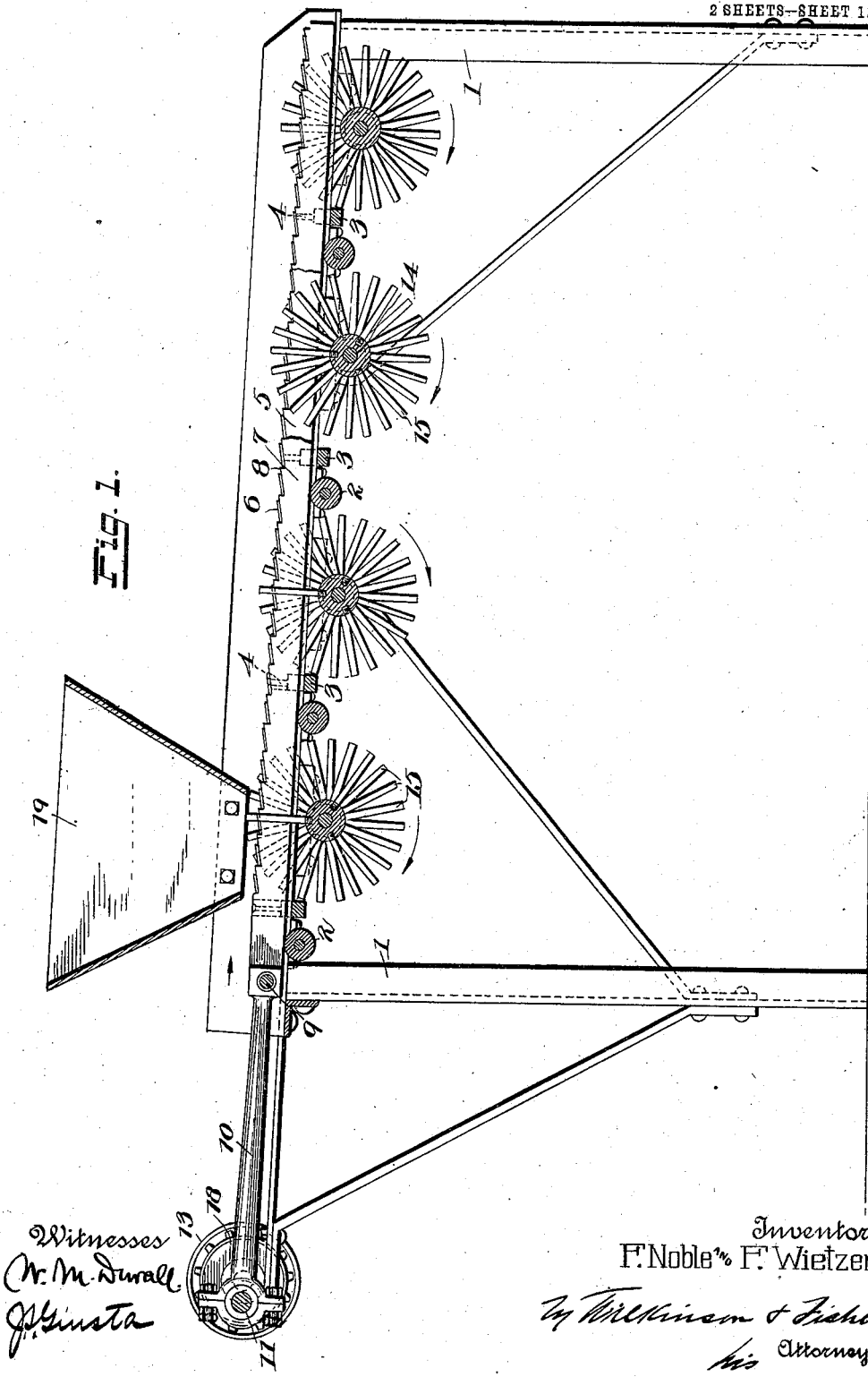
Figure 2:
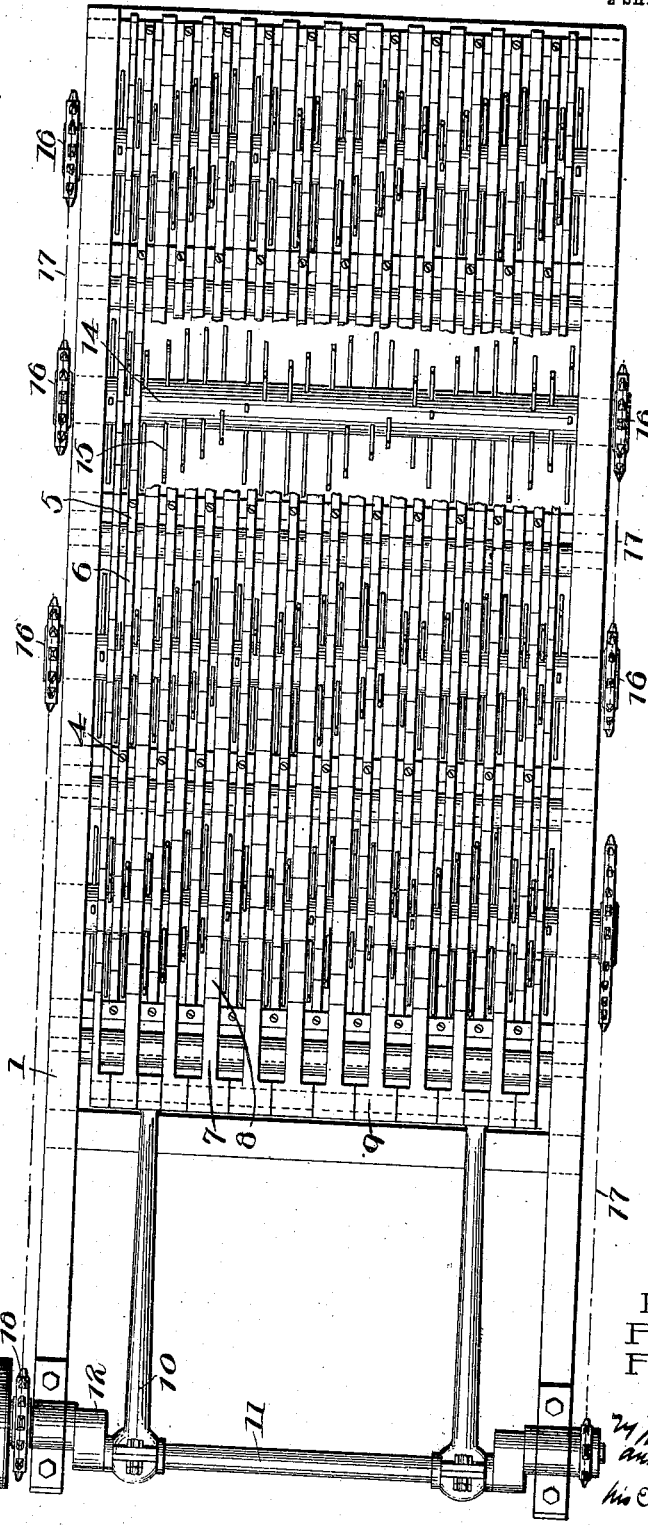

Figure 1 is a longitudinal vertical section through the machine. Fig. 2 is a plan view of the machine with the hopper removed.

1 designates a main frame suitably stayed and provided with the transverse rollers 2 and cross beams 3.

Extending longitudinally of the frame and secured on the top of the cross beams 3 as by screws or bolts 4 are a plurality of spaced stationary bars 5 provided with a stepped or toothed upper edge 6.

Mounted on the rollers 2 and extending longitudinally of the machine is a jigger frame comprising a plurality of spaced jigger bars 7, alternating with said stationary bars and similarly provided on their upper edge with a stepped or toothed surface 8.

Both the stationary bars and the bars of the jigger frame incline downwardly from the forward to the rear or discharge end of the machine.

The forward or entrance end of this jigger frame is provided with a coupling rod 9 passing through the spaced ends of the jigger bars and holding same securely together at that end and pivotally connected to said coupling rod 9 is one or a pair of pitman bars 10 connected to the wrist pin 11 of crank mechanism 12 operated by suitable power, illustrated in the drawings by a pulley 13.

Extending transversely of the machine below said spaced bars and jigger frame are a plurality of separator rollers comprising rotatable shafts 14, having a plurality of series of spirally arranged fingers 15, one finger of each spiral being adapted to operate in a slot or space formed between said stationary bars and jigger bars, and the tops of each finger when in their uppermost position being adapted to extend a short distance above the stepped surfaces of the jigger bars and stationary bars.

The rotatable shafts are operated in any suitable way to work uniformly, and for the purpose of illustration, in the drawings each shaft is shown as being provided with sprocket wheels 16 connected by sprocket chains 17 with each other and with a sprocket wheel or sprocket wheels 18 on the crank shaft.

19 designates a hopper located at the forward part of the machine above the first rotating separator wheel.

In operation it will be observed that the separator rollers are geared up so that they will rotate in the same direction of movement, as indicated by the arrows in Fig. 1, and will also rotate in the same direction of movement as the effective thrust of the jigger frame, so that power being applied to the pulley 13 and the beets being dumped into the hopper 19, the fingers of the first separator wheel will pass between the beets and will force some of the leaves and trash downwardly through the spaces formed between the jigger bars and stationary bars and at the same time tend, together with the effective thrust of the stepped surfaces of said jigger bars, to force the beets themselves rearwardly towards the discharge end of the machine, the reciprocating action of the jigger bars carrying the beets from the first roller to the next roller, where the operation is continued, until finally when the beets are discharged at the rear end of the machine, the refuse matter will have been separated therefrom. It will be understood of course that the spaces between the jigger bars and the stationary bars are of such a width as to prevent the passage of the beets therethrough in their movement towards the discharge end of the machine.

What I claim is:—

In a refuse separator for beets, the combination of a stationary frame provided with inclined stepped parallel bars, rollers carried thereby, a movable frame provided with stepped parallel bars, said movable frame moving back and forth on said rollers in the plane of the stationary bars, a plurality of separator rollers, each provided with a series of spirally-disposed fingers, playing between the stationary and movable bars, and means for reciprocating said movable frame and for rotating said separator rollers, substantially as described.

In testimony whereof, we affix our signatures, in presence of two witnesses.

FREDERICK NOBLE.
　　　　　　　　　　　FREDERICK WIETZER.

Witnesses:
　J. J. ARMSTRONG,
　A. S. MALOCSAY.